United States Patent
Mueller et al.

(10) Patent No.: US 9,240,071 B2
(45) Date of Patent: Jan. 19, 2016

(54) THREE-DIMENSIONAL X-RAY IMAGING

(71) Applicants: Kerstin Mueller, Erlangen (DE);
Christopher Rohkohl, Bochum (DE);
Günter Lauritsch, Nürnberg (DE);
Chris Schwemmer, Forchheim (DE)

(72) Inventors: Kerstin Mueller, Erlangen (DE);
Christopher Rohkohl, Bochum (DE);
Günter Lauritsch, Nürnberg (DE);
Chris Schwemmer, Forchheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 201 days.

(21) Appl. No.: 13/959,011

(22) Filed: Aug. 5, 2013

(65) Prior Publication Data
US 2015/0036905 A1 Feb. 5, 2015

(51) Int. Cl.
G06K 9/00 (2006.01)
G06T 15/08 (2011.01)
G06T 11/00 (2006.01)

(52) U.S. Cl.
CPC .............. *G06T 15/08* (2013.01); *G06T 11/005* (2013.01); *G06T 11/006* (2013.01); *G06T 2211/412* (2013.01)

(58) Field of Classification Search
None
See application file for complete search history.

(56) References Cited

U.S. PATENT DOCUMENTS

| 7,133,041 B2 * | 11/2006 | Kaufman | G06T 15/005 345/419 |
| 8,483,351 B2 * | 7/2013 | Wang et al. | 378/4 |
| 2003/0007593 A1 * | 1/2003 | Heuscher et al. | 378/4 |
| 2005/0135664 A1 * | 6/2005 | Kaufhold | G06T 11/006 382/131 |
| 2005/0238141 A1 * | 10/2005 | Tsujii | 378/208 |
| 2007/0036418 A1 * | 2/2007 | Pan | A61B 6/5288 382/131 |
| 2010/0189337 A1 * | 7/2010 | Jandt | A61B 6/481 382/132 |
| 2011/0142317 A1 * | 6/2011 | Riddell | G06T 11/006 382/131 |
| 2011/0298793 A1 * | 12/2011 | Lauritsch | A61B 6/504 345/419 |
| 2012/0207370 A1 * | 8/2012 | Fahimian et al. | 382/131 |
| 2012/0314921 A1 * | 12/2012 | Star-Lack et al. | 382/131 |
| 2013/0315453 A1 * | 11/2013 | Cao | A61B 6/032 382/128 |

OTHER PUBLICATIONS

Ritschl Ludwig et al.: "Improved total variation-based CT image reconstruction applied to clinical data", in: Phys. Med. Biol., vol. 56, 2011, pp. 1545-1561, DOI:10.1088/0031-9155/56/6/003.

Guang-Hong Chen et al.: "Prior image constrained compressed sensing (PICCS): A method to accurately reconstruct dynamic CT imgages from highly undersampled projection data sets", in: Med. Phys., vol. 35, No. 2, pp. 660-663, Feb. 2008.

(Continued)

*Primary Examiner* — Nancy Bitar

(57) ABSTRACT

A 3D result image of an object is reconstructed from a set of X-ray two-dimensional projections of the object. A 3D reference image of the object is reconstructed by employing a compressed sensing technique based on at least some of the 2D projections at a reference motion state of the object. By employing an algebraic and/or analytic reconstruction technique, 3D intermediate images are reconstructed for various motion states of the object. The 3D intermediate images are registered with the 3D reference image to obtain spatial transformations for the various motion states of the object. Based on the spatial transformations, the 3D intermediate images are transformed to a joint phase and combined to obtain the 3D result image.

18 Claims, 6 Drawing Sheets

(56) References Cited

OTHER PUBLICATIONS

Feldkamp L.A. et al.: "Practical Cone-Beam Algorithm", in: J. Opt Soc. Am. A 1 (1984), vol. 1, Iss. 6, pp. 612-619, DOI:10.1364/JOSAA.1.000612.

Andersen, A.H. et al.: "Simultaneous algebraic reconstruction technique (SART): a superior implementation of the art algorithm", in: Ultrason Imaging, 1984, Iss. 6, pp. 81-94.

* cited by examiner

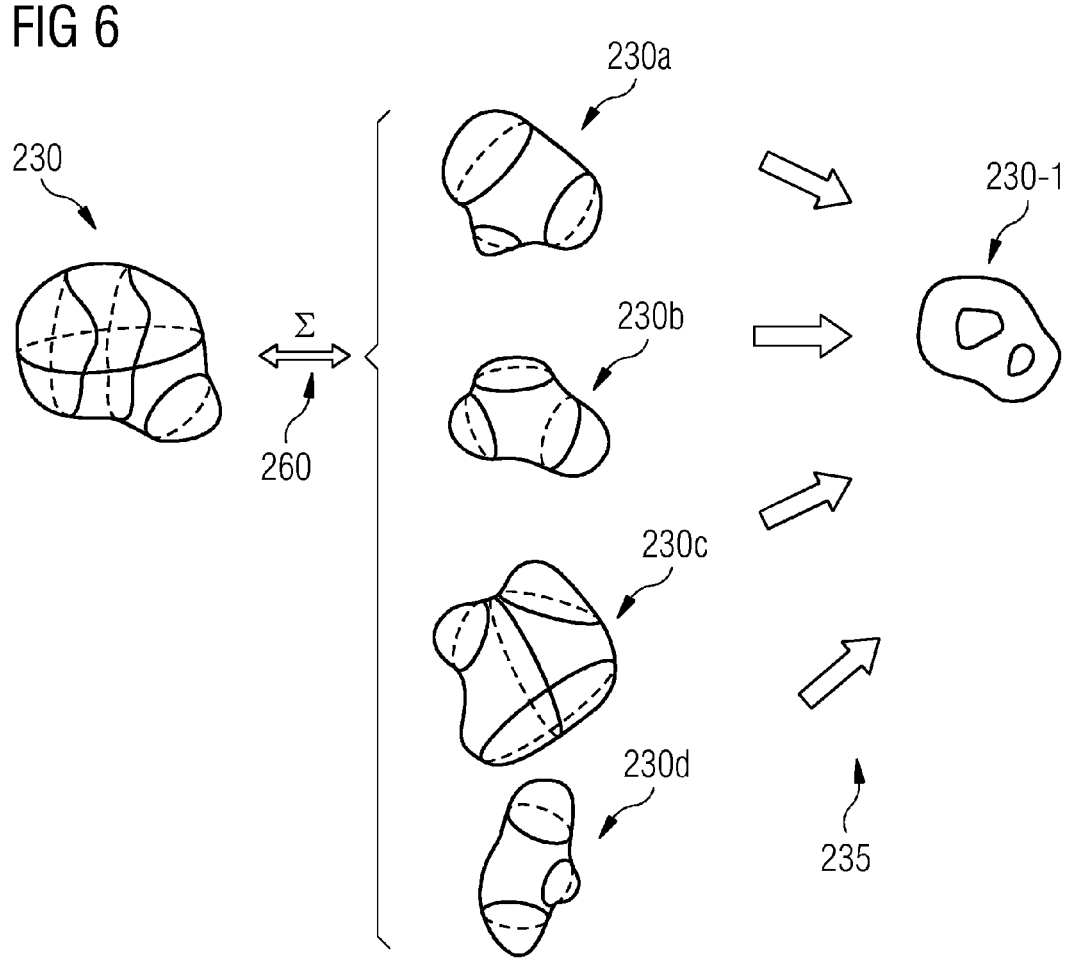

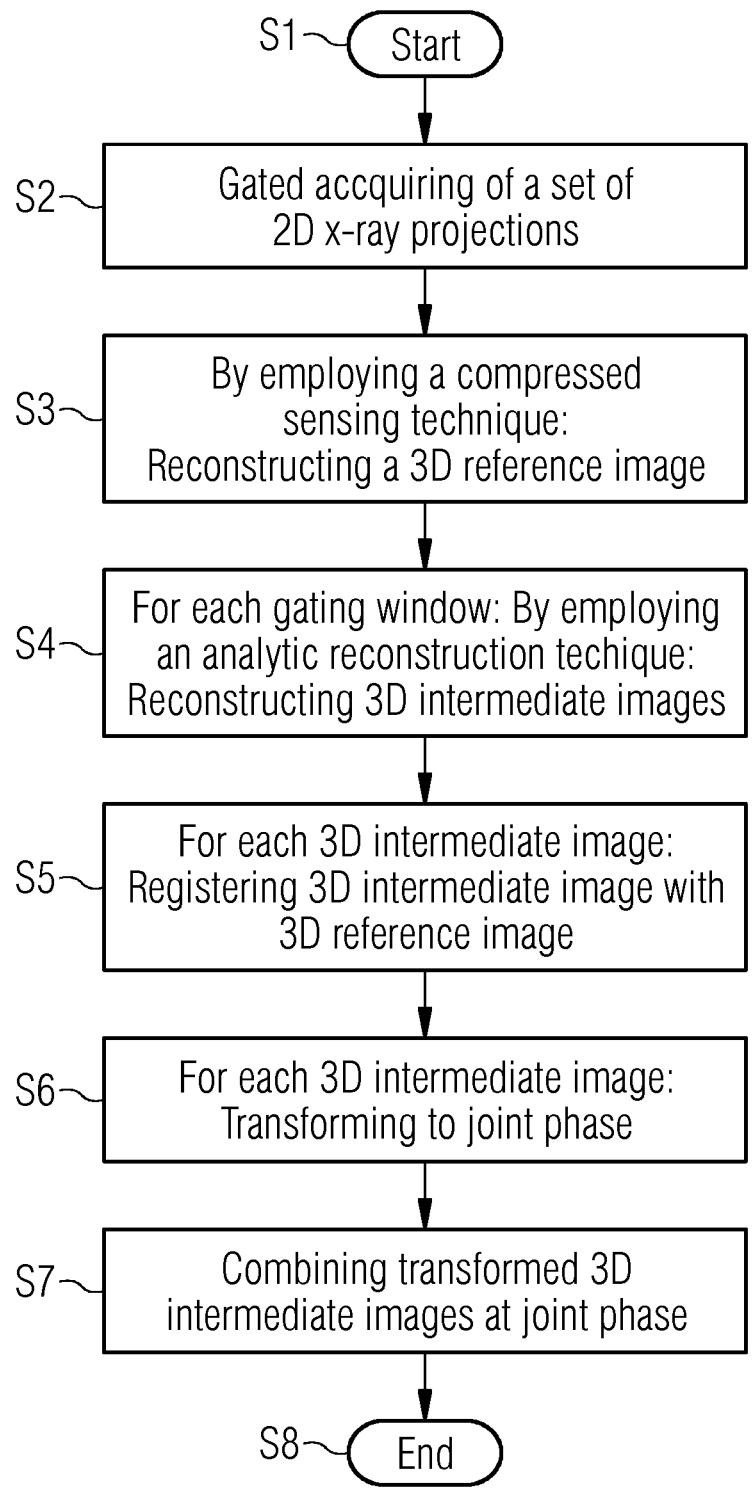

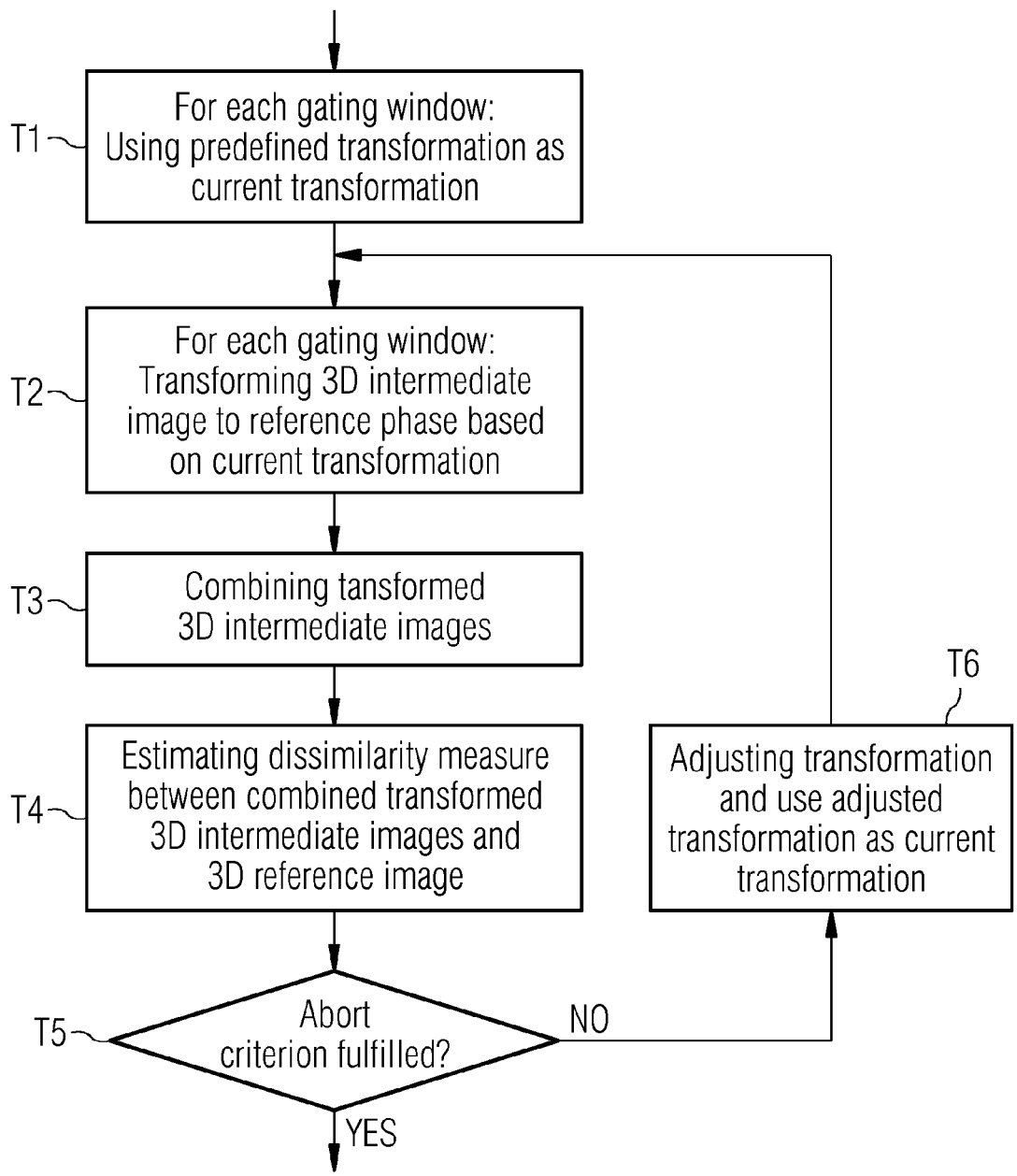

US 9,240,071 B2

THREE-DIMENSIONAL X-RAY IMAGING

FIELD OF INVENTION

Techniques of reconstructing a three-dimensional image of an object from a set of X-ray two-dimensional projections of the object are discussed. In particular, such techniques are discussed which employ a compressed sensing technique and an algebraic and/or analytic reconstruction technique.

BACKGROUND OF INVENTION

Techniques are known which acquire X-ray two-dimensional projections of an object by employing an X-ray device. Such 2D projections of the object find application in various medical fields, including, but not limited to visual guidance during interventions.

Often, a three-dimensional reconstruction is desirable to further obtain depth information of the object. In such a case, a given pixel of a 3D image may be associated with a 3D position in space. Techniques are known which enable to reconstruct the 3D image from a plurality of 2D projections, e.g. the so-called Feldkamp-Davis-Kress(FDK)-algorithm, see "Practical Cone-Beam Algorithm" by L. A. Feldkamp, L. C. Davis, and J. W. Kress in J. Opt. Soc. Am. A 1 (1984) 612. The FDK algorithm and various derivations thereof are sometimes referred to as analytic reconstruction techniques. Furthermore, different kinds of algebraic reconstruction techniques are known for the 3D reconstruction, see "Simultaneous algebraic reconstruction technique (SART): a superior implementation of the art algorithm" by A. H. Andersen and A. C. Kak in Ultrason Imaging (1984) 6 (1984) 81-94. Typically, a considerable number of 2D projections needs to be acquired for successfully reconstructing the 3D image. This may lengthen measurement time and/or increase an X-ray dose exposure. Furthermore, so-called compressed sensing techniques have evolved, see, e.g., "Improved Total Variation-Based CT Image Reconstruction Applied to Clinical Data" by L. Ritschl et al. in Phys. Med. Biol. 56 (2011) 1545 and "Prior Image Constrained Compressed Sensing (PICCS): A Method to Accurately Reconstruct Dynamic CT Images from Highly Undersampled Projection Data Sets" by G-H. Chen, J. Tang, and S. Leng in Med. Phys. 35 (2008) 660. Such compressed sensing techniques typically rely on a limited underlying data set of 2D projections on which the reconstruction is based, sometimes referred to as sparsified image data. Here it is possible that comparably fewer image pixels of the 2D projections have significant image values and/or that comparably fewer 2D projections are used for the reconstruction. In such a scenario, employing conventional algebraic and/or analytic reconstruction techniques may not be possible or only possible to a limited degree; such that, in effect, the compressed sensing techniques enable to shorten the measurement time and reduce the X-ray dose exposure if compared to the conventional algebraic and/or analytic reconstruction techniques.

Yet, such compressed sensing techniques face certain restrictions. E.g., employing compressed sensing techniques may result in the reconstructed 3D image to have an artificial look and being smoothed if compared to conventional analytic reconstruction techniques, such as the FDK algorithm. Sometimes, the 3D images obtained by a compressed sensing technique are referred to as being piecewise constant in homogeneous regions and as omitting small structures. For example, fine structures and features of the object may be lost in the 3D image. This may limit the medical applicability of compressed sensing techniques.

SUMMARY OF INVENTION

Therefore, a need exists to provide advanced techniques for reconstructing 3D images from a set of 2D projections of the object. In particular, a need exists for techniques which require only a limited set of 2D projections and thereby have a limited X-ray dose exposure and a limited measurement time. Furthermore, a need exists for such techniques which properly reconstruct small structures and avoid any artificial look of the reconstructed 3D images.

This need is met by the features of the independent claims. The dependent claims define embodiments.

According to an aspect, a method of reconstructing a 3D image of an object from a set of X-ray 2D projections of the object is provided. The object exhibits a periodic motion. The method comprises, by employing a gated X-ray imaging technique: acquiring the set of 2D projections, each projection of the set of 2D projections being acquired at a respective phase within one of a plurality of gating windows. The gating windows are associated with the periodic motion. Further, each projection of the set of 2D projections is acquired at a respective perspective with respect to the object. The method further comprises, for a given gating window being associated with a reference phase of the periodic motion: by employing a compressed sensing technique, reconstructing a 3D reference image of the object based on at least some of the 2D projections within the given gating window. The method further comprises, for each gating window: by employing an algebraic and/or analytic reconstruction technique, reconstructing a 3D intermediate image of the object based on at least some of the 2D projections within the respective gating window. The method further comprises registering the 3D intermediate images with the 3D reference image to obtain a spatial transformation for each gating window between the respective phase and the reference phase. The method further comprises transforming the 3D intermediate images to a joint phase of the periodic motion based on the spatial transformation obtained for each gating window. The method further comprises combining the transformed 3D intermediate images to obtain a 3D result image of the object.

According to a further aspect, an X-ray device is provided which is configured to reconstruct a 3D image of an object from a set of X-ray 2D projections of the object. The object exhibits a periodic motion. The X-ray device comprises an image acquisition unit. The image acquisition unit is configured to acquire the set of 2D projections by employing a gated X-ray imaging technique. Each projection of the set of 2D projections is acquired at a respective phase within one of a plurality of gating windows which are associated with the periodic motion. Further, each projection of the set of 2D projections is acquired at a respective perspective with respect to the object. The X-ray device further comprises at least one processor which is configured to reconstruct, for a given gating window being associated with a reference phase of the 3D periodic motion, a 3D reference image of the object based on at least some of the 2D projections within the given gating window and by employing a compressed sensing technique. The at least one processor of the X-ray device is further configured to reconstruct, for each gating window, a 3D intermediate image of the object based on at least some of the 2D projections within the respective gating window by employing an algebraic and/or analytic reconstruction technique. The at least one processor is further configured to register the 3D intermediate images with the 3D reference image to obtain a spatial transformation for each gating window between the respective phase of the respective 3D intermediate image and the reference phase. The at least one processor is further configured to transform the 3D intermediate images to a joint phase of the periodic motion based on the spatial transformation obtained for each gating window. The at least one processor is further configured to combine the transformed 3D intermediate images to obtain a 3D result image of the object.

According to a further aspect, a method of reconstructing a 3D image of an object from a set of X-ray 2D projections of the object is provided. The object exhibits a periodic motion. The method comprises acquiring the set of 2D projections at various motion states of the periodic motion and at various perspectives. The method comprises, for a reference motion state: reconstructing a 3D reference image by employing a compressed sensing technique. The method comprises, for various motion states: reconstructing 3D intermediate images by employing an algebraic and/or analytic reconstruction technique. The method comprises registering the 3D intermediate images to the 3D reference image to obtain transformations and transforming the 3D intermediate images to the reference motion state by means of the transformations. The method comprises determining a 3D result image from a combination of the transformed 3D intermediate images.

Various aspects and embodiments of the invention as described above and hereinafter can not only be used in the combinations explicitly described, but also in other combinations. Various modifications will occur to the skilled person upon reading and understanding of the description.

BRIEF DESCRIPTION OF THE DRAWINGS

Various embodiments will be explained in further detail with respect to the accompanying drawings. In these drawings:

FIG. 6 illustrates the combining of 3D images to obtain a 3D result image.
FIG. 7 is a flowchart of a method of reconstructing a 3D image of an object according to various embodiments.
FIG. 8 is a flowchart which illustrates further details of the method of FIG. 7.

DETAILED DESCRIPTION OF INVENTION

Figure 1:
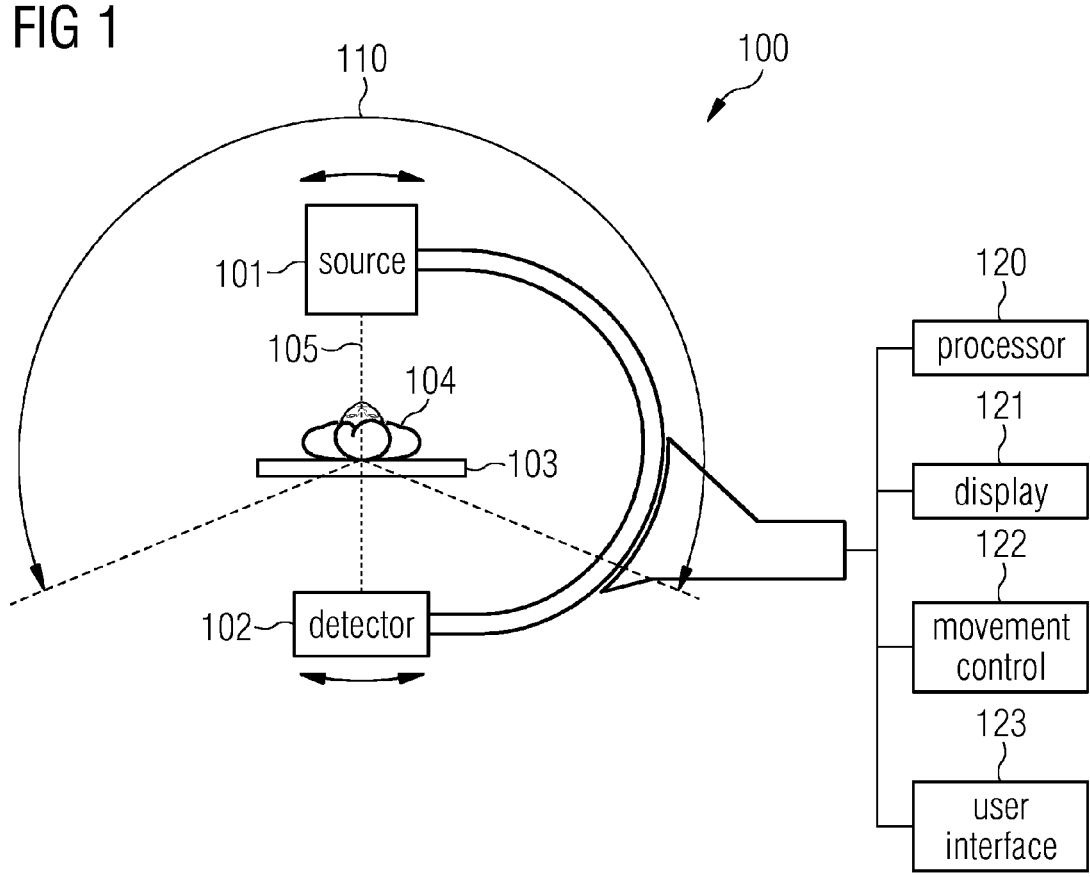
FIG. 1 is a schematic illustration of a C-arm X-ray device.

In the following, various embodiments of the invention will be described in detail with reference to the accompanying drawings. It is to be understood that the following description of embodiments is not to be taken in a limiting sense. The scope of the invention is not intended to be limited by embodiments described hereinafter or by the drawings, which are to be taken illustratively only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are presented where a 3D result image of an object is obtained, i.e. reconstructed from a set of X-ray 2D projections of the object. For example, the set of X-ray 2D projections can be acquired by employing an X-ray device such as a C-arm device. While hereinafter reference will be made predominantly to a C-arm device, respective techniques may be readily employed using different X-ray devices, e.g., a computer tomography (CT) scanner.

The various techniques described hereinafter take into account a periodic motion of the object. Hereinafter, reference will be made predominantly to the periodic motion relating to the heartbeat of a patient; however, it should be understood that periodic motion can relate to various periodic or cyclic motions of, e.g., the human body, such as breathing or the swallowing reflex. Each point in time may be associated with a phase of the periodic motion, i.e., varying between 0° and 360°, respectively 0 and 2π. It is also possible to define a relative heart phase, e.g., varying between 0 and 1 or 0% and 100%.

Typically, the periodic motion is present during the acquiring of the set of 2D projections. Therefore, each 2D projection may correspond to a different motion state of the 2D periodic motion, e.g., systole and diastole. In particular, it is often possible to assign a certain phase of the periodic motion to each projection of the set of 2D projections.

In this regard, various embodiments rely on gating techniques. Gating techniques of various kinds are known to the person skilled in the art. Gating techniques include prospective and retrospective gating. Hereinafter, reference will be predominantly made to retrospective gating techniques; however, it should be understood that the various techniques may be readily employed with respect to other gating techniques, including prospective gating.

Further, various embodiments rely on employing an algebraic and/or analytic reconstruction technique to reconstruct 3D intermediate images for different motion states of the periodic motion. These 3D intermediate images are registered to a 3D reference image which is obtained for a reference phase of the periodic motion by employing a compressed sensing technique. The correspondingly obtained spatial transformation for each motion state enables to accumulate the 3D intermediate images to obtain a 3D result image of the object.

Turning to FIG. 1, a C-arm device 100 is illustrated. The C-arm device 100 can be employed to acquire the set of 2D projections. The C-arm device 100 comprises an X-ray source 101 and an X-ray detector 102. The X-ray source 101 can emit X-rays which travel along a path of X-rays 105 (illustrated in FIG. 1 by the dotted line) towards the X-ray detector 102. The path 105 traverses an object 104 which is arranged on a table 103, e.g., a patient. When traversing the object 104, the X-rays can exhibit an absorption and/or a phase change. Such parameters and/or further parameters may be used in order to obtain a 2D projection of the object 104, i.e., 2D image data which pictures the object 104 at a given perspective. For example, each pixel value of the 2D projection may be proportional to the absorption of the X-rays having traveled along the respective path 105. The perspective of the 2D projections may be adjusted by relatively rotating and/or relatively shifting one of the X-ray source 101 as well as the X-ray detector 102, and the object 104 with respect to each other. A typical range 110 of such a rotation is illustrated in FIG. 1 and may, e.g., amount to 270°.

Often, the X-ray source 101 and X-ray detector 102 are continuously swept within the range 110, i.e., with a time-constant angular velocity, while acquiring the set of 2D projections. By such means, each projection of the set of 2D projections is acquired at a respective perspective with respect to the object. Employing such a continuous sweep in order to acquire the 2D projections of the object at various perspectives is only one of many possible techniques. For example, it is also possible to acquire the 2D projections by iteratively moving the X-ray source 101 and/or the X-ray detector 102 and acquiring one or more of the 2D projections at a time. Such a technique may also be referred to as step-and-acquire technique.

In this regard, the C-arm device comprises a movement control 122 which controls the movement of the X-ray source 101 and/or of the X-ray detector 102. In particular, the movement control 122 is in communication with at least one processor 120, e.g. a multi-core processor or a single-core processor, which controls the image acquisition. Further, the processor 120 fulfils various tasks including, but not limited to: image acquisition control, exposure planning, image reconstruction, image rendering. It may even be possible that the movement control 122 is formed as a functional entity with the processor 120 where the respective tasks are executed by the processor 120.

The processor 120 is further in communication with a display 121 which is configured to display the acquired 2D projection and/or the reconstructed 3D images. A user interface 123 is configured to receive input from a user and/or provide output to the user in order to control various process parameters of the image acquisition and the image reconstruction. For example, the user interface may comprise elements which are selected from the group comprising: a keyboard, a mouse, a touch-pad, a display, a voice recognition entity, a gesture recognition entity, and so forth.

Typically, not the entire object 140 is imaged by employing the X-ray imaging technique. This may be of technical reasons, e.g., the X-ray device 100 having a limited field of view and/or of X-ray dosimetric reasons, i.e., the desire to limit the exposed parts to the necessary imaging region to reduce the X-ray dose deposited in the object 140. Rather, the imaging typically is restricted to a certain portion of the object 104. In various applications, the certain portion can relate to the heart of a patient. The art of the imaging of the heart is known as angiography.

Figure 2:
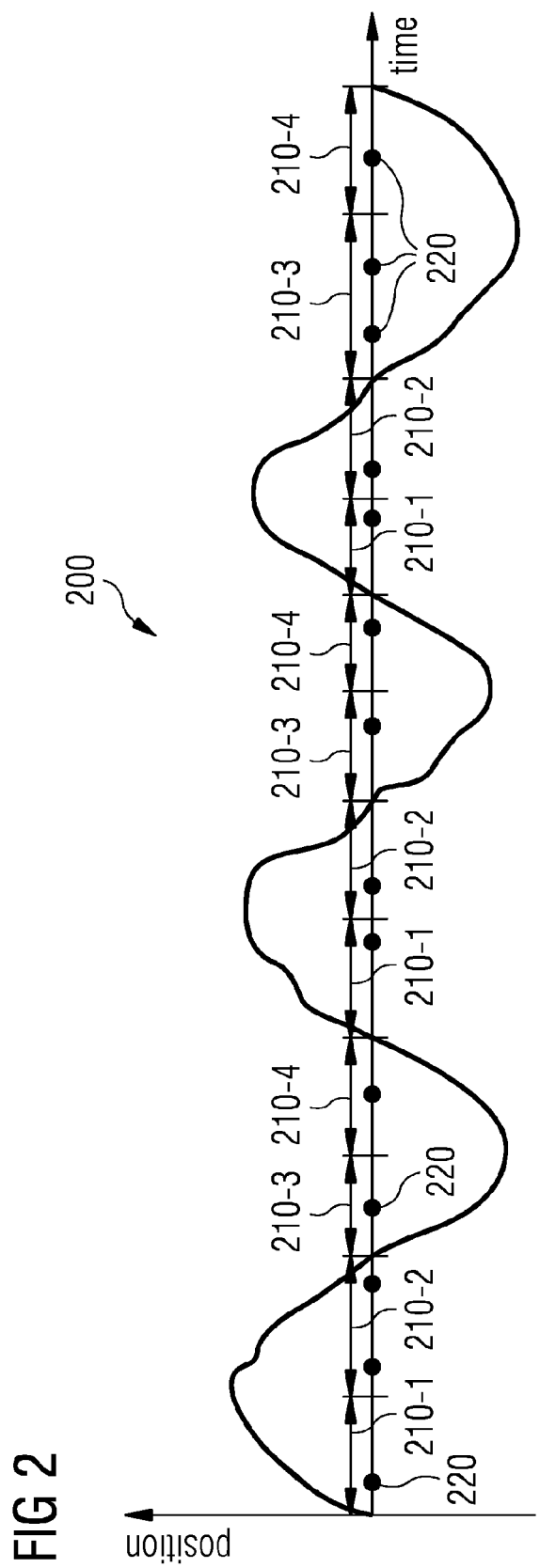
FIG. 2 illustrates a periodic motion of an object and gating windows.

In such a scenario, but also in various other applications, it is possible that the imaged portion of the objection 104 exhibits a periodic motion. An example of such a periodic motion 200 is illustrated in FIG. 2. FIG. 2 illustrates an application of angiography and exemplarily shows the position, e.g., of the ventricular heart wall, over time. Yet, the various general properties of the periodic motion 200 may be correspondingly present for, e.g., breathing, etc.

In FIG. 2, full circles denote times where a 2D projection 220 is acquired. As can be seen, typically the time duration needed for acquiring one of the 2D projections 220 is short if compared to the period of the periodic motion 200. E.g., up to 25 or 35 projections per second may be acquired. However, scenarios may occur where the time duration needed for acquiring one of the 2D projections 220 amounts to a significant fraction of the period of the periodic motion 200. Each 2D projection 220 is associated with a certain phase of the periodic motion 200. The phase of the 3D projection 220 may be defined in various manners; e.g., the phase of a given 2D projection may be defined as the phase of the periodic motion 200 at the beginning or the end or half of the acquiring of the given 2D projection 220.

For example, the periodic motion 200 can be measured by means of an electrocardiogram (ECG) measurement, navigator measurements, e.g., employing X-ray imaging and/or other imaging techniques, and/or breathing pads which are applied to the skin of the patient. In general, the temporal resolution of the measurement of the periodic motion 200 can vary; e.g., employing ECG measurements it may be possible only to detect so-called R-peaks, i.e., one measurement point per cycle of the periodic motion 200. Of course, higher temporal resolutions are also possible. Various further techniques of measuring the periodic motion 200 are known to the skilled person such that there is no need to discuss further details in this context.

The phase of the periodic motion 200 can be determined, e.g., with respect to a certain well-defined feature of the periodic motion 200. Such a feature could be, e.g., the R-peak of an ECG measurement, in case the periodic motion 200 corresponds to the heart beat. E.g., the R-peak of an ECG measurement can correspond to a phase of 0%(0°) of the periodic motion 200; a linear increase of the phase towards the next R-peak can be assumed, the linear increase being such that the phase reaches 100%(360°) at the next R-peak. Of course, various other possibilities of determining the phase of the periodic motion 200 are feasible. It would also be possible to determine the phase of the periodic motion 200 based on an amplitude or the like.

In order to take into account the periodic motion 200 when acquiring the set of 2D projections 220, it is possible to employ a gating technique. In the embodiment illustrated in FIG. 2, a retrospective gating technique relying on gating windows 210-1, 210-2, 210-3, 210-4 is employed. The first gating window 210-1 covers phases of the periodic motion 200 amounting approximately to 0°-90° (0%-25%). Respectively, the second, third, and fourth gating windows 210-2, 210-3, 210-4 respectively relate to phases of the periodic motion 200 amounting to approximately 90°-180° (25%-50%), 180°-270° (50%-75%), and 270°-360° (75%-100%). Another example would be to employ only a single gating window which covers 45%-55%. In this regard, each gating window 210-1-210-4 corresponds to a certain motion state of the periodic motion 200. The number of gating windows and/or the extents of each gating window 210-1-210-4 may be retrospectively defined. The gating windows 210-1-210-4 can be thought of as bins into which a certain 2D projection 220 is sorted in dependence of the corresponding phase at which the 2D projection 220 has been acquired. The bins can be larger or smaller; the number of bins may vary. It is also possible to prospectively define the number of gating windows and/or the extents of each gating window 210-1-210-4. In this regard, a given gating window 210-1-210-4 can comprise a larger or smaller number of 2D projections 220. Sometimes, a gating window 210-1-210-4 can comprise only a single 2D projections 220, or a larger number of 2D projections 220.

For example, it is possible to retrospectively define the gating windows 210-1-210-4 once said acquiring of the set of 2D projections 220 is completed. In this regard, it is possible to correlate the time of acquiring of each 2D projection 220 of the set of 2D projections 220 with a current position or phase of the periodic motion 200.

As can be seen from FIG. 2, a particular gating window 210-1-210-4 corresponds to a particular motion state, e.g. a predefined range of phases of the periodic motion 200. For example, the gating windows, e.g., a number thereof and/or a covered range, can be retrospectively defined such that per cycle of the periodic motion a single 2D projection is within a given gating window. This is the case for the first two cycles of the periodic motion 200 as depicted in FIG. 2. Only in the last depicted third gating window 210-3 two 2D projections 220 are situated. In general, it is possible that the definition criterion of the gating windows 210-1-210-4 does not change over the imaging period.

For example, the repetition rate of the acquiring of the 2D projections may be fixed or may be variable. In particular, the repetition rate may depend on a sweep rate of the motion of the X-ray source 101 and the X-ray detector 102 and/or a exposure time, i.e., a duration which is required for acquiring each one of the 2D projections. The exposure time may, e.g., depend on elements selected from the group comprising: dose, revolution, field of view, sensitivity of the detector 102.

As can be further seen from FIG. 2, a position of each 2D projection 220 within the gating windows 210-1-210-4 varies: some of the 2D projections 220 are acquired at a point in time closer to the beginning of a gating window 210-1-210-4 while other 2D projections 220 are acquired at a point in time closer to the end of a gating window 210-1-210-4. For example, it is possible to consider this—temporal—position of each 2D projection 220, e.g., with respect to the gating windows 210-1-210-4 when reconstructing 3D images from the 2D projections 220.

Figure 3:
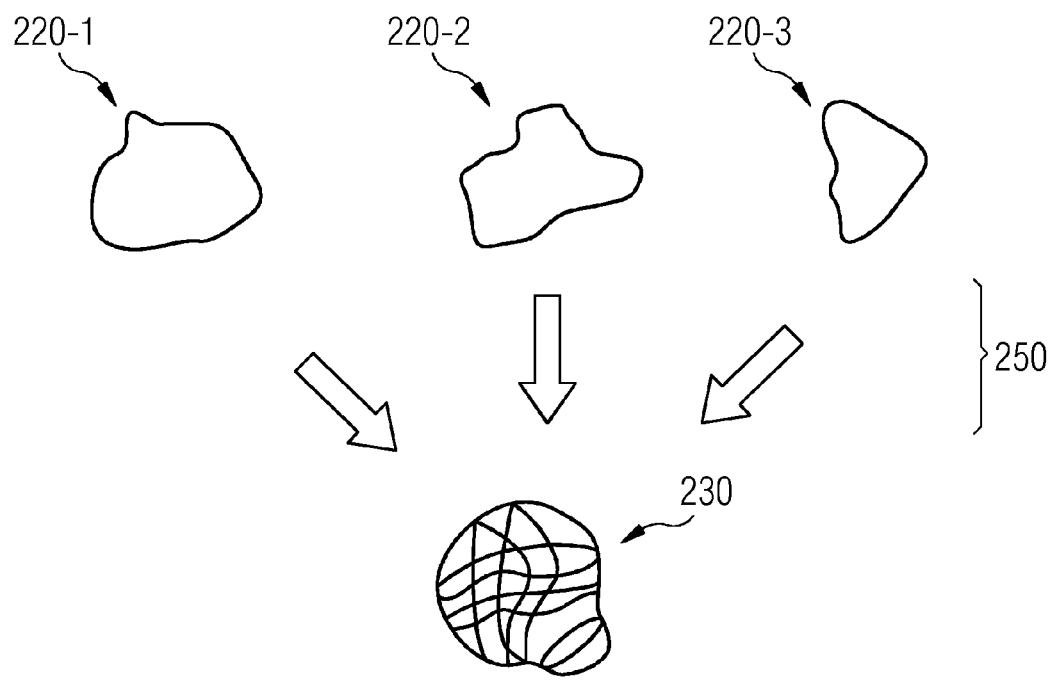
FIG. 3 illustrates the reconstruction of a 3D image from 2D projections.

In FIG. 3, an image reconstruction technique 250 is illustrated. The image reconstruction technique 250 as depicted in FIG. 3 reconstructs a 3D image 230 from three 2D projections 220-1, 220-2, 220-3. The reconstructing 250 is illustrated by the three arrows.

In order to be able to fully reconstruct the 3D image 230, i.e., without ambiguities, typically a certain amount of 2D projections 220-1-220-4 from various perspectives is required. In the scenario of FIG. 1, there are only three 2D projections 220-1-220-3 employed in order to reconstruct the 3D image 230. Typically, a larger number, e.g. twenty or forty or even hundred 2D projections 220-1-220-4, may be employed for the reconstruction 250. Depending on the number, an image quality of the reconstructed 3D image 230 may vary.

Various image reconstruction techniques 250 are known to the skilled person. Examples include, but are not limited to: algebraic and/or analytic techniques, such as the FDK algorithm, and compressed sensing techniques, such as the iTV algorithm and the PICCS algorithm. Typically, image reconstruction techniques 250 of the class of the compressed sensing techniques require only a smaller number of 2D projections 220-1, 220-2, 220-3 in order to reconstruct the 3D image 230. Sometimes, a situation of too few 2D projections being available for reconstructing the 3D image 230 is referred to as an undersampled underlying data set. When relying on an undersampled underlying data set, image artifacts may result.

Figure 4:
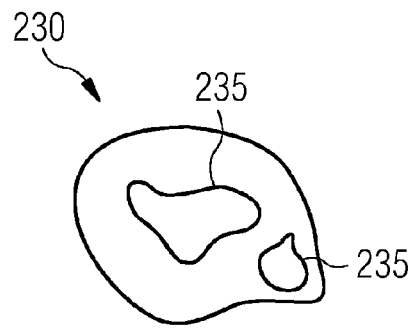
FIG. 4 illustrates image artifacts in the 3D object.

However, it is known that also the compressed sensing techniques sometimes inherently result in image artifacts as illustrated in FIG. 4; of course, such the image artifacts inherent to the compressed sensing technique can be of different kind and nature as the image artifacts encountered when employing an undersampled underlying data set as mentioned above. In FIG. 4, a 3D image 230 which is obtained from an image reconstruction technique 250 such as the PICCS algorithm is illustrated. Fine structures and small features are not visible in the 3D image 230 of FIG. 4. Rather, the 3D image 230 is piecewise constant as illustrated by the artifacts 235 depicted by full lines in FIG. 4.

Figure 5:
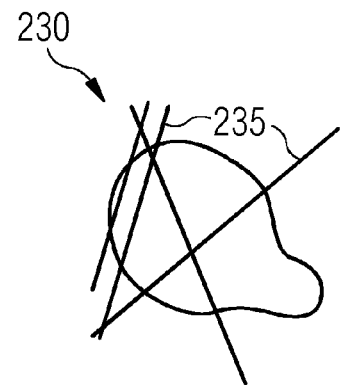
FIG. 5 illustrates further image artifacts in the 3D object.

In FIG. 5, a 3D image 230 is illustrated which is obtained by employing an image reconstruction technique 250 according to the FDK algorithm which operates on an undersampled set of 2D projections 230-1-230-4. For example, the number of 2D projections 230-1-230-4 can be smaller than required, a situation sometimes referred to as sparse sampling condition. From this, the line artifacts 235 as illustrated in FIG. 5 may result.

A further class of image artifacts, which is not shown in FIGS. 4 and 5, is motion artifacts. In order to avoid motion artifacts, typically 2D projections 220-1, 220-2, 220-3 are employed for the image reconstruction technique 250 which originate from the same gating window 210-1, 210-2, 210-3, 210-4. By this it can be ensured that the 2D projections 210-1, 210-2, 210-3 which are used for the reconstruction of the 3D image 230 all originate from the same motion state or at least from a comparable motion state, i.e., have the same or related phases of the periodic motion 200.

As can be seen from a comparison of FIGS. 4 and 5, both the compressed sensing image reconstruction techniques and the algebraic and/or analytic image reconstruction techniques may exhibit image artifacts 235 which in turn can limit the medical usability of the 3D images 230-1-230-2. In the following, various embodiments will be discussed which enable to obtain a 3D result image of the object 104 which does not show such artifacts 235 in a significant manner or only shows such artifacts 235 to a comparably limited degree.

In various embodiments, a compressed sensing technique is employed for image reconstruction based on at least some of the 2D projections 220-1-220-4 within a given gating window 210-1-210-4 in order to reconstruct a 3D reference image 230-1 (cf. FIG. 6). In other words, the compressed sensing technique may operate on an underlying data set of 2D projections 220-1-220-4 which all have comparable phases, i.e., phases which are within a certain range, e.g., as defined by a gating window 210-1-210-4. This 3D reference image 230-1 is therefore associated with a reference phase of the periodic motion 200. It typically features artifacts 235 as discussed with respect to FIG. 4 above, e.g., may be piecewise constant.

Furthermore, for each gating window 210-1-210-4, a 3D intermediate image 230a-230d is respectively reconstructed by employing an algebraic and/or analytic reconstruction technique, e.g., the FDK algorithm or a derivate thereof. Typically, the 3D intermediate images 230a-230d may feature a significant amount of the artifacts 235 as discussed above with respect to FIG. 5.

For example, when comparing FIG. 6 with FIG. 2, it is possible that the 3D reference image 230-1 is reconstructed based on the 2D projection 220 situated within the gating window 210-1 which is depicted at the beginning of the illustrated periodic motion 200 in FIG. 2. Likewise, it is possible that each one of the 3D intermediate images 230a-230d is respectively reconstructed from the 2D projections 220 which are situated within a given one of the gating windows 210-1-210-4.

Further, the 3D intermediate images 230a-230d are registered 255 to the 3D reference image 230-1. By this, a spatial transformation is obtained for each gating window 210-1-210-4, respectively motion state, between the respective phase corresponding to a particular 3D intermediate image 230a-230d and the reference phase corresponding to the 3D reference image 230-1. Then, the 3D intermediate images 230a-230d are transformed to a joint phase, e.g. the reference phase, of the periodic motion 200 based on these spatial transformations. The spatial transformations can correspond to functions transforming a certain position, respectively pixel, at the phase of the corresponding the 3D intermediate image 230a-230d to a certain position, respectively pixel, at the joint phase.

The transformed 3D intermediate images are furthermore combined or accumulated 260 to yield the 3D result image 230 of the object (depicted on the left hand side of FIG. 6). It is possible that the 3D result image 230 shows no or only few and/or insignificant artifacts 235. For example, the 3D result image 230 may be significantly free of line artifacts and may further not be piecewise constant. The motion artifacts can be avoided by considering the spatial transformations between the various motion states of the periodic motion 200 as obtained from the registering 255.

For example, the registering 255 of the 3D intermediate images 230a-230d with the 3D reference image 230-1 can occur in a combined manner where all of the 3D intermediate images 230a-230d are jointly compared with the 3D reference image 230-1. Further, the registering 255 can comprise iteratively optimizing the spatial transformations. For example, the iteratively optimizing can comprise transforming the 3D intermediate images 230a-230d to the reference phase of the periodic motion 200 based on a current spatial transformation and combining the transformed 3D intermediate images.

For example, the iteratively optimizing may include a given number of iterations. In a first fraction of the given number of iterations, said registering may operate on a downsampled version of the 3D reference image 230-1 and/or the 3D intermediate images 230a-230d, i.e. a thinned out version operating on a fewer number of pixels. By such means, computational efforts may be reduced, while the overall result of the registering may not be negatively affected or only affected to a limited degree.

The iteratively optimizing can minimize a dissimilarity measure between the reference 3D image 230-1 and the combined transformed 3D intermediate images by adjusting the current spatial transformation between subsequent iterations. In other words, the transformations obtained from the registering 255 can be such that the combined transformed 3D intermediate images 230a-230d are closely resembling the reference 3D image 230-1. The dissimilarity measure for example can be a negative normalized cross-correlation between the reference 3D image 230-1 and the combined transformed 3D intermediate images 230a-230d. However, in general any other dissimilarity measure can be employed.

Formally, this registering and transforming can be described as follows: a certain number H of ECG-gated volumes $f_h(x)$, i.e. the 3D intermediate images 230a-230d, with h=1, . . . , H at specific phases of the periodic motion 200 are reconstructed employing the FDK reconstruction algorithm mentioned above. The ECG-gating can be performed by inserting a weighting function λ into the conventional FDK approach. $q_h \in [0,1]$ is the relative phase of the periodic motion 200 at which the reconstruction shall be carried out: the volume $f_h(x)$ represents one phase of the periodic motion 200 from 1, . . . , H. The ECG-gated FDK reconstruction $f_h(x)$: $R^3 \rightarrow R$ at voxel $x \in R^3$ is given by:

$$f_h(x) = \sum_{i=1}^{N} \lambda(i, q_h) \cdot w(i, x) \cdot p_F(i, A(i, x)) \tag{1}$$

where N is the number of 3D projections 220, $w:N \times R^3$ is the FDK distance weight and $p_f(i,u):N \times R^2 \rightarrow R$ is the filtered and redundancy-weighted projection data of the i-th 2D projection at pixel position u. The pixel position is determined by the perspective projection at voxel x, $A:N \times R^3 \rightarrow R^2$ $(i,x) \rightarrow A(i,x)=u$. The perspective projection A can be computed via pre-calibrated projection matrices. For example, the weighting function λ can be a cosine- or rectangular window. However, as mentioned above, a strict rectangular gating function can be readily employed, e.g., of minimal width such to consider only one view per cycle or period of the periodic motion 200. Therefore, a temporal position of a 2D projection 220 within a respective gating window 210-1-210-4 can be considered as a weight of the algebraic and/or analytic reconstruction technique and reconstructing the 3D intermediate images 230a-230d. The transforming of the 3D intermediate images 230a-230d can include interpolating voxels of the transformed 3D intermediate images 230a-230d to reference voxels. For example, the reference voxels can correspond to the voxels of the 3D reference image 230-1.

Once optimized spatial transformations are obtained, i.e. spatial transformation which minimizes the dissimilarity measure between the combined transformed 3D intermediate images 230a-230d and the 3D reference image 230-1, it is possible to obtain the 3D result image 230 by combining 260 the 3D intermediate images 230a-230d. For example, the 3D result image can be defined as a sum volume f(x,s) consisting of deformed ECG volumes $f_h(x+s_{h,x})$ with motion vector $s_{h,x}$ at phase h of the period motion 200 and location x:

$$f(x, s) = \sum_{h=1}^{N} f_h(x + s_{h,x}). \tag{2}$$

By executing the registration 255 in order to minimize the dissimilarity measure between the transformed and combined 3D intermediate images 230a-230d and the 3D reference image 230-1, it is possible to superimpose the 3D intermediate images 230a-230d such that both motion artifacts and streak or line artifacts 235 (cf. FIG. 5) are eliminated or reduced by appropriate accumulation of the image data. In particular, an undersampled or sparsely sampled condition can be avoided by considering 2D projection data from which the 3D result image 230 is obtained to include all kinds of motion states of the periodic motion 200. Also, the artificial look of the 3D images 230-1 which are reconstructed by the compressed sensing techniques (cf. FIG. 4) does not negatively influence the 3D result image 230, as the corresponding 3D reference image 230-1 is only used for the purpose of the image registration 255.

In FIG. 7, a flowchart of a method of reconstructing the 3D result image 230 from the set of 2D projections 220 is illustrated. The method starts in step S1. In step S2, the set of 2D X-ray projections 220 is acquired by employing a gated X-ray imaging technique. For example, it is possible that the gating windows 210-1-210-4 are retrospectively defined. However, various other gating windows 210-1-210-4 may be employed. It may also be possible to employ prospective gating where only certain 2D projections 220 are accepted depending on the respective corresponding phase of the periodic motion 200. If an acquired 2D projection 220 has a phase which is outside a gating window, in prospective gating techniques this 2D projection 220 may be rejected.

Next, in step S3, a compressed sensing technique is employed to reconstruct the 3D reference image. The compressed sensing technique operates on 2D projections 220 of a given gating window 210-1-210-4, i.e., considers 2D projections 220 at a predefined motion state of the periodic motion 200. The compressed sensing technique can be, e.g. the PICSS or iTV algorithm as mentioned above.

Then, in step S4, for the 2D projections 220 situated in each gating window an algebraic and/or analytic reconstruction technique, such as the FDK algorithm or derivations thereof, is employed. By these means, a number of 3D intermediate images 230a-230d is obtained. The number of 3D intermediate images 230a-230d corresponds to the number of gating windows 210-1-210-4 in this embodiment. However, in general, the number of gating windows can differ from the number of 3D intermediate images 230a-230d.

These 3D intermediate images 230a-230d are then registered 255 with the 3D reference image 230-1 (step S5). From this a spatial transformation from the corresponding phase of each 3D intermediate image 230a-230d to the reference phase of to the 3D reference image 230-1 is obtained. These spatial transformations are employed in step S6 to transform each 3D intermediate image to a joint phase. For example, the joint phase can correspond to the reference phase or can be a different phase. In the latter case, it may be possible to correspondingly calculate adapted spatial transformations from the spatial transformation obtained from step S5, e.g., by suited linear combinations or other vector algebraic techniques.

Lastly, in step S7, the transformed 3D intermediate images of step S6 are combined 260 in order to obtain the 3D result image 230. In general, the combining 260 can take various forms, e.g., in a simple scenario may correspond to an addition. For example, weighting factors may be considered. It may also be possible to execute more complex mathematical functions as part of the combining 260, e.g., including a multiplication.

The method ends in step S8.

It is possible that the registering 255 in step S5 comprises iteratively optimizing the spatial transformations. Such an iteratively optimizing is illustrated in the flowchart of FIG. 8, which corresponds to the execution of step S5.

First, in step T1, for each gating window 210-1-210-4 a predefined transformation is selected as a current transformation. For example, the predefined transformations selected in step T1, i.e. the initial transformations, can be equal to zero, i.e., not shifting any pixels.

Next, in step T2, each 3D intermediate image 230a-230d is transformed to the reference phase based on the current transformation. I.e., for the first execution of step T2, i.e. the first iteration, the predefined transformation of step T1 is employed in step T2. The execution of step T2 results in corresponding pixels changing position.

Subsequently, the transformed 3D intermediate images 230a-230d are combined (step T3), e.g., using the same combination technique as in step S7 of FIG. 7, and a dissimilarity measure between the combined and transformed 3D intermediate images 230a-230d and the 3D reference image 230-1 is determined in step T4.

In step T5 it is checked whether an abort criterion is fulfilled. For example, the abort criterion can be defined with respect to the dissimilarity measure. For example, if the dissimilarity measure corresponds to a dissimilarity between the combined transformed 3D intermediate images 230a-230d and the 3D reference image 230-1 which is smaller than a threshold, i.e., only a comparably small dissimilarity present, the abort criterion in step T5 may be fulfilled. Further, the abort criterion can consider alternatively or additional other criterions, e.g., a number of iterations.

If the abort criterion in step T5 is not fulfilled, the method commences with step T6. In step T6, the current transformation is adjusted, e.g., based on an optimization algorithm. Various optimization algorithms can be employed. The adjusted transformation is then used as the current transformation in the subsequent execution of steps T2, T3, and T4. If the abort criterion in step T5 of FIG. 8 is fulfilled, the method commences with step S6 of FIG. 7.

Although the invention has been described and explained with respect to various embodiments as illustrated in the figures, other modifications and embodiments will occur to those skilled in the art and are subject to the present application. The scope of the present application is only limited by the claims.

E.g., various specific numbers and values have been used for the extents of the gating windows 210-1-210-4 in order to better illustrate various embodiments. In general, these numbers and values can vary. E.g., it would be possible the different gating windows 210-1-210-4 have different extents 210-1-210-4. For example, the gating window used when reconstructing the 3D reference image 230-1 can be smaller or larger if compared to the gating windows 210-1-210-4 which are used when reconstructing the 3D intermediate images 230a-230d.

The invention claimed is:

1. A method for reconstructing a 3D image of an object from a set of x-ray 2D projections of the object, the object exhibiting a periodic motion, comprising:

acquiring the set of x-ray 2D projections by employing a gated x-ray imaging technique, each projection of the set of 2D projections being acquired at a respective phase within one of a plurality of gating windows associated with the periodic motion and at a respective perspective with respect to the object;

reconstructing a 3D reference image of the object by employing a compressed sensing technique based on at least some of the 2D projections within a given gating window being associated with a reference phase of the periodic motion;

reconstructing a plurality of 3D intermediate images of the object by employing an algebraic and/or analytic reconstruction technique based on at least some of the 2D projections, wherein each of the 3D intermediate images is reconstructed within each of the gating windows;

registering each of the 3D intermediate images with the 3D reference image to obtain a spatial transformation for each of the gating windows between the respective phase and the reference phase;

transforming each of the 3D intermediate images to a joint phase of the periodic motion based on the spatial transformation; and combining each of the transformed 3D intermediate images to obtain the 3D image of the object.

2. The method as claimed in claim 1, wherein the 3D intermediate images are jointly compared with the 3D reference image for registering each of the 3D intermediate images with the 3D reference image.

3. The method as claimed in claim 1, wherein the registering comprises iteratively optimizing the spatial transformation comprising:

transforming the 3D intermediate images to the reference phase of the periodic motion based on a current spatial transformation, combining the transformed 3D intermediate images, wherein the iteratively optimizing minimizes a dissimilarity measure between a reference 3D image and the combined transformed 3D intermediate images by adjusting the current spatial transformation between subsequent iterations, wherein the iteratively optimizing comprises a given number of iterations, and wherein in a first fraction of the given number of iterations the registering operates on a downsampled version of the 3D reference image and the 3D intermediate images.

4. The method as claimed in claim 1, wherein the 2D projections within each of the gating windows fulfill a sparse sampling condition.

5. The method as claimed in claim 1, wherein the gating windows of the gated x-ray imaging technique are retrospectively defined after the acquiring such that per cycle of the periodic motion a single 2D projection is within a given gating window.

6. The method as claimed in claim 5, wherein a temporal position of a 2D projection within a respective gating window is considered as a weight of the algebraic and/or analytic reconstruction technique when reconstructing the 3D intermediate images.

7. The method as claimed in claim 1, wherein each of the 3D intermediate images is transformed by interpolating voxels of the transformed 3D image to reference voxels.

8. The method as claimed in claim 1, wherein the set of x-ray 2D projections is acquired by a C-arm X-ray device having an x-ray source together with an x-ray detector being rotated with respect to the object.

9. The method as claimed in claim 1, wherein the compressed sensing technique comprises Prior Image Constrained Compressed Sensing technique and Improved Total Variation technique.

10. The method as claimed in claim 1, wherein the algebraic reconstruction technique comprises Feldkamp-Davis-Kress technique.

11. An x-ray device for reconstructing a 3D image of an object from a set of x-ray 2D projections of the object, the object exhibiting a periodic motion, comprising:
  an image acquisition unit configured to acquire the set of 2D projections by employing a gated x-ray imaging technique, each projection of the set of 2D projections being acquired at a respective phase within one of a plurality of gating windows associated with the periodic motion and at a respective perspective with respect to the object; and
  a processor configured to:
    reconstruct a 3D reference image of the object based on at least some of the 2D projections by employing a compressed sensing technique for a given gating window being associated with a reference phase of the periodic motion;
    reconstruct a plurality of 3D intermediate images of the object by employing an algebraic and/or analytic reconstruction technique based on at least some of the 2D projections, wherein each of the 3D intermediate images is reconstructed within each of the gating windows,
    register each of the 3D intermediate images with the 3D reference image to obtain a spatial transformation for each of the gating windows between the respective phase and the reference phase,
    transform each of the 3D intermediate images to a joint phase of the periodic motion based on the spatial transformation, and
    combine each of the transformed 3D intermediate images to obtain the 3D image of the object.

12. The x-ray device as claimed in claim 11, wherein the processor is configured to register the 3D intermediate images with the 3D reference image by jointly comparing the 3D intermediate images with the 3D reference image.

13. The x-ray device as claimed in claim 11, wherein the processor is configured to iteratively optimize the spatial transformation for the registering comprising:
  transforming the 3D intermediate images to the reference phase of the periodic motion based on a current spatial transformation,
  combining the transformed 3D intermediate images,
  wherein the iteratively optimizing minimizes a dissimilarity measure between a reference 3D image and the combined transformed 3D intermediate images by adjusting the current spatial transformation between subsequent iterations,
  wherein the iteratively optimizing comprises a given number of iterations,
  wherein in a first fraction of the given number of iterations the registering operates on a downsampled version of the 3D reference image and the 3D intermediate images.

14. The x-ray device as claimed in claim 11, wherein the 2D projections within each of the gating windows fulfill a sparse sampling condition.

15. The x-ray device as claimed in claim 11, wherein the image acquisition unit is configured to retrospectively define the gating windows of the gated x-ray imaging technique after the acquiring such that per cycle of the periodic motion a single 2D projection is within a given gating window.

16. The x-ray device as claimed in claim 15, wherein the image acquisition unit is configured to consider a position of a 2D projection within a respective gating window as a weight of the algebraic and/or analytic reconstruction technique when reconstructing the 3D intermediate images.

17. The x-ray device as claimed in claim 11, wherein the processor is configured to interpolate voxels of the transformed 3D image to reference Voxels for the transforming.

18. The x-ray device as claimed in claim 11, wherein the X-ray device is a C-arm X-ray device comprising an x-ray source together with an x-ray detector being rotated with respect to the object.

* * * * *